(12) United States Patent
Hohwald et al.

(10) Patent No.: US 7,752,195 B1
(45) Date of Patent: Jul. 6, 2010

(54) UNIVERSAL QUERY SEARCH RESULTS

(75) Inventors: Heath W Hohwald, San Francisco, CA (US); Yu Shan Fung, Burlingame, CA (US)

(73) Assignee: A9.com, Inc., Palo Alto, CA (US)

( * ) Notice: Subject to any disclaimer, the term of this patent is extended or adjusted under 35 U.S.C. 154(b) by 214 days.

(21) Appl. No.: 11/506,495

(22) Filed: Aug. 18, 2006

(51) Int. Cl.
    *B06F 17/30* (2006.01)

(52) U.S. Cl. ................................. 707/715; 707/723

(58) Field of Classification Search .............. 707/3, 707/6–7
    See application file for complete search history.

(56) References Cited

U.S. PATENT DOCUMENTS

| | | | | |
|---|---|---|---|---|
| 7,219,090 | B2 * | 5/2007 | Travis, Jr. ...................... | 707/3 |
| 7,281,002 | B2 * | 10/2007 | Farrell ........................... | 707/3 |
| 7,293,016 | B1 * | 11/2007 | Shakib et al. ................... | 707/3 |
| 7,356,530 | B2 * | 4/2008 | Kim et al. ....................... | 707/7 |
| 2006/0161534 | A1 * | 7/2006 | Carson et al. .................. | 707/3 |
| 2007/0192293 | A1 * | 8/2007 | Swen ............................. | 707/3 |
| 2007/0203891 | A1 * | 8/2007 | Solaro et al. ................... | 707/3 |
| 2007/0239713 | A1 * | 10/2007 | Leblang et al. ................ | 707/6 |

* cited by examiner

*Primary Examiner*—Mohammad Ali
*Assistant Examiner*—Huawen Peng
(74) *Attorney, Agent, or Firm*—Townsend and Townsend and Crew LLP (57) ABSTRACT

A universal query result set is generated from several different search index result sets by including identifications of items from the different search index result sets in an accurate manner. After a query has been submitted, search index result sets are received from several different search indexes, an allocation score for each search index is computed and a universal item score for the top-level item identified in each search index is computed. The allocation score and the universal item score are combined for the top level item for each search index result set. The item with the highest combined score is added to the universal query result set.

34 Claims, 7 Drawing Sheets

| QUERY RESULTS | |
|---|---|
| RANK | ITEM |
| 1 | Howard, the Autobiography |
| 2 | Howard and God |
| 3 | Howard Visits Rome |
| 4 | Howard's Evil Empire |
| 5 | Howard on Computers |
| 6 | Howard and Eugene Travel the World |
| 7 | Howard and His Bike |
| 8 | Howard Sings Christmas Carols |
| 9 | Howard Brand Overalls |
| 10 | Howard Teaches |

UNIVERSAL QUERY SEARCH RESULTS

BACKGROUND

With the increase in electronically accessible material, the ability to find that material in an organized and efficient manner is becoming more difficult. One technique typically used for finding and organizing electronically accessible material is through the use of search engines. For example, a user may submit a query containing one or more parameters that are used to search for items that are identified in response to the query. The parameters are compared to an index, referred to herein as a "search index," containing identifications of electronically accessible material, and ordered listings of items matching the query parameters are returned. The search index, upon identifying items matching the query parameters, typically organizes or ranks the identification of those items based on how close they match the query parameters. The organized items are then returned to the searching entity in the form of a query result set.

While the above searching technique works well for searching a single search index and obtaining an ordered query result set from that search index, it does not provide an efficient means for searching multiple indexes and obtaining a single ordered query result set. Using the above technique, an entity would have to individually search each search index and then manually review each of the different query results sets. One technique that has been implemented to attempt to resolve this deficiency is through the simple merging of multiple query result sets based on the ranking of individual items identified within those sets. However, because different search indexes utilize different properties and definitions for determining the relevance of items matching the parameters of a query, the simple merged query result set will likely not contain an accurate ordering of the item identifications contained therein. Because different search indexes utilize different definitions and parameters for ranking matching items, an item of higher actual relevance to the query may be ranked lower than another item from a different search index that is of less actual relevance because of the different factors used in ranking those items by the different search indexes.

Accordingly, there is a need for a system and method for merging identifications of items from separate query result sets into a single query result set such that those identifications of items are more accurately ordered based on actual relevance to the query.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present invention, a method for generating a universal query result set is provided. Generally described, the method includes receiving a query containing at least one parameter and submitting that query to a plurality of search indexes. After the query has been submitted, search index result sets are received from each of the plurality of search indexes. The search index result sets each contain different lists of items that, based on the information maintained by the respective search index, best matches the parameters of the query. After the search index result sets have been received, an allocation score for each search index is computed and a universal item score for the top-level item identified in each search index is computed. For each search index, the method then combines the allocation score and the universal item score for the top level item from the same search index. The item with the highest combined score is then added to the universal query result set. Generally, the item with the highest combined score will be the item that has the highest probability of satisfying the query.

In accordance with another aspect of the present invention, a computer system having a computer-readable medium including a computer-executable program therein for performing a method for generating a universal query result set in response to a query is provided. The computer-executed method includes queuing a first search index result set and a second search index result set. Each of the index result sets are ordered lists identifying items related to the query. Additionally, because each of the index result sets are provided by different search indexes, the lists themselves will be different. Based on items, identified in the lists, an item having a highest probability of satisfying the query is determined and added to the universal query result set.

In accordance with another aspect of the present invention, a computer-readable medium having instructions stored thereon that direct a computing system to generate a universal query result set from a group of search index result sets is provided. The instructions direct the computing system to submit a query to a plurality of search indexes and queue the search index result sets as they are received. Each of the plurality of search index result sets are ordered lists identifying items related to the query. Additionally, a query index association for each of the search indexes is determined for the given query. Based on the items contained in the queued search index result sets and the query index associations, a universal query result set that includes a list of items obtained from the plurality of search index result sets is created. The universal index result set includes an ordered list based on a universal probability of those items satisfying the query, wherein the list of items contains items obtained from different search index result sets.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
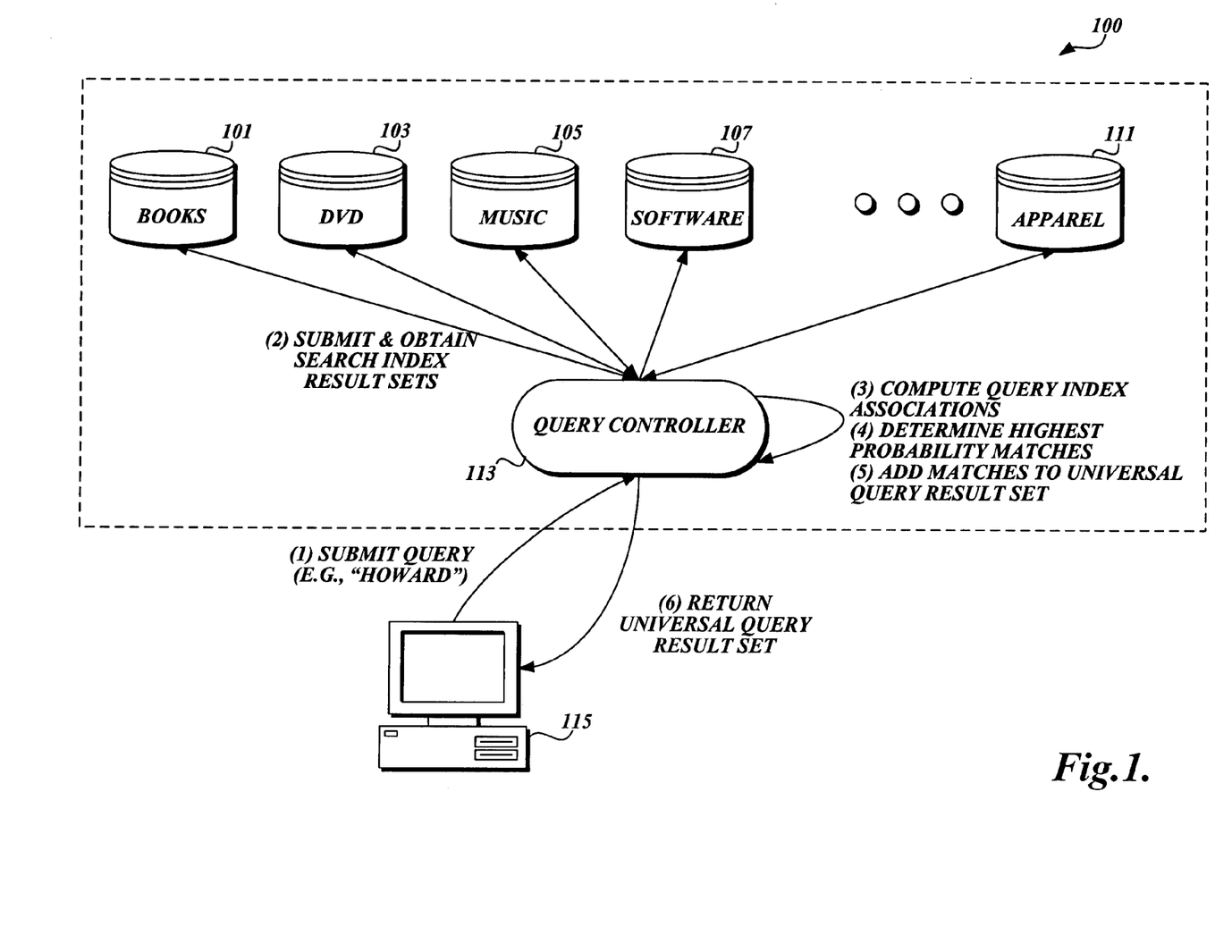
FIG. 1 is a state diagram illustrating a universal query routine for obtaining search results from multiple different search indexes, according to embodiments of the present invention.

FIG. 1 is a state diagram illustrating a universal query routine for obtaining search results from multiple different search indexes, according to embodiments of the present invention. Through the use of a query controller 113, search results (referred to herein as "search index result sets") may be obtained from multiple search indexes, such as a books search index 101, DVD search index 103, music search index 105, software search index 107, and apparel search index 111. After obtaining the search index result sets, the query controller combines identifications of items from different search index result sets to generate a universal query result set. As described in more detail below, the identifications of items selected and organized into the universal query result set are organized such that the items listed in the universal query result set are those items, out of all items identified by the different search index result sets, that have the highest probability of satisfying the query.

While the state diagram of FIG. 1 illustrates the different search indexes 101-111 as being different physical objects, as will be appreciated by one of skill in the relevant art, the different search indexes may all be on one computing device, multiple different computing devices, or any combination there between. Additionally, the query controller 113 may reside on a computing device with one or more of the search indexes, on a stand-alone computing device, or a computing device that is used for submitting a query. Similarly, the search indexes may identify any type of item and those listed and used herein are provided as examples only. Moreover, more than one search index may identify the same (partially or wholly) or similar items. Additionally, the search indexes may be part of a single entity maintaining multiple search categories or randomly dispersed throughout a computing network, such as the Internet.

At an initial point, a query is submitted to the query controller 113 using a computing device, such as computing device 115. The query has one or more parameters, or search terms, that are used to identify items that are relevant to the query. A query may be submitted automatically, through an API, or input by a user who desires to obtain universal search results.

Upon receiving a query, such as a query containing the search parameter "Howard," the query controller 113 determines an appropriate set of search indexes for which query result sets are to be obtained. For example, based on the query parameters submitted to the query controller 113, the query controller 113 may identify a subset from a larger set of search indexes that are most likely relevant to the query parameters. For example, the query controller 113 may identify similar historical queries and select search indexes that provided identifications of items for those historical queries, or select search indexes that provided identifications of items that were selected from those historical queries. Still further, the query may include additional parameter identifiers that may be used by the query controller to identify the most likely search indexes for use in identifying items relevant to the query. For example, in addition to a query containing the parameter "Howard" the entity that generated the query may also identify that the desired item will be of a particular type, such as entertainment, movies, books, music, etc. Alternatively, the query controller 113 may identify all search indexes associated with that query controller 113 for use in obtaining index query result sets.

Upon identification of the search indexes, the query controller 113 submits the query to the determined search indexes and obtains search index query result sets from each of the different search indexes 101-111. Search index result sets may be generated and returned in any manner. For embodiments of the present invention, the only assumption made about returned search index result sets is that the items listed in the set are ordered or identified by relevance with respect to the submitted query.

In addition to submitting query parameters to determined search indexes and obtaining search index result sets, the query controller 113 computes, or determines, query index associations for each of the determined search indexes, as described in more detail below with respect to FIG. 5. Based on the computed query index associations and the obtained search index result sets, the query controller 113 determines the identified item having the highest probability of satisfying the query.

Figure 2:
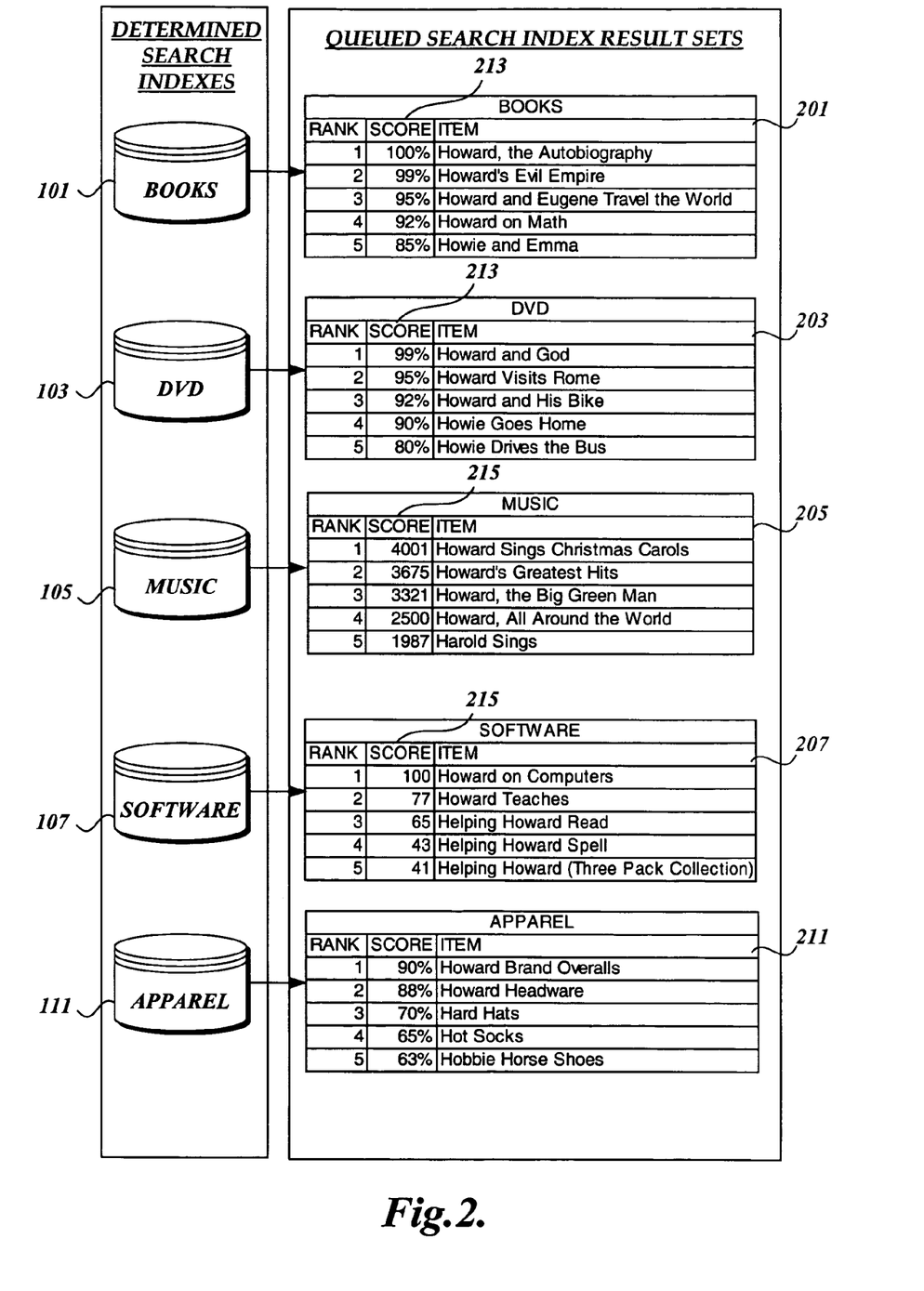
FIG. 2 is a block diagram of the search index result sets obtained in response to a query, generated in accordance with an embodiment of the present invention.

FIG. 2 is a block diagram of the search index result sets obtained in response to a query having the parameters "Howard" submitted to the books search index 101, DVD search index 103, music search index 105, software search index 107, and apparel search index 111. As shown, the content of the search index result sets are ordered by relevance with respect to the submitted query parameters. For example, using the query parameters of "Howard," the books search index 101 returns an ordered search index result set 201 that includes an identification of five items matching the parameter "Howard." Similarly, the DVD search index returns an ordered search index result set 203 listing DVDs that match the search parameter "Howard." The music search index 105 returns an ordered search index result set 205 listing music, such as CDs, matching the search parameter "Howard." The software search index 107 returns an ordered software search index result set 207 identifying software that matches the query parameter "Howard." Finally, the apparel search index 111 returns an apparel search index result set 211 identifying an ordered list of apparel items having a name that matches the query parameter "Howard." While this example uses five different search indexes, any number of search indexes may be used for obtaining search index result sets. Similarly, each search index result set may identify any number of items.

Typically, search indexes contain internal relevance ranking functions that are used to order items to be returned in response to a submitted query. However, different search indexes, such as the book search index 101 and the apparel search index 111, often have different internal relevance ranking functions for use in ordering identifications of items returned in response to a query. As can be seen from FIG. 2, the ranking or relevance of items may be determined based on a variety of ranking criteria. For example, the books search index 101 and the DVD search index 103 may rank items based on a percentage value 213 of relevance. In contrast, the music search index 105 and software search index 107 may rank items based on a scaled range of numbers 215. Any type and combination of ranking criteria may be used with embodiments of the present invention and those discussed herein are provided only as examples. Because different search indexes have different relevance ranking functions and order items based on different ranking criteria, a direct merging of results does not generate an accurate universal query result set. However, in accordance with embodiments of the present invention, the ranking criteria may be normalized across all search index result sets, and through the use of additional techniques of combining independent search results, discussed below, a higher likelihood of an appropriate listing of items from the different search index result sets may be obtained and used for generating a universal query result set. Normalization of multiple ranking criteria may be accomplished using any normalization technique. For example, all ranking criteria may be modified to a set percentage ranging (e.g., 0%-100%). Alternatively, all ranking criteria may be adjusted to all fall within a standard range (e.g., 0-100).

Figure 3:
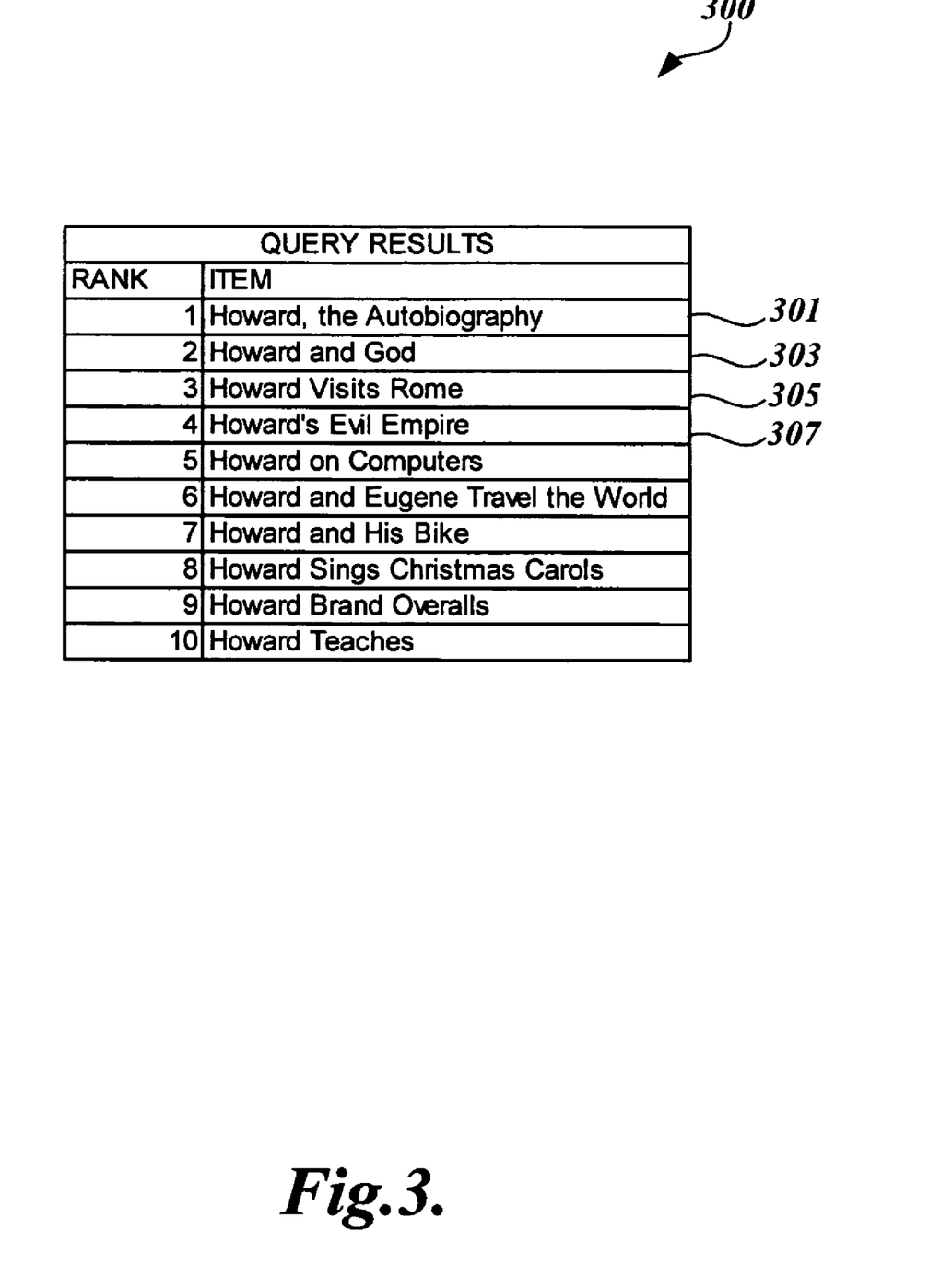
FIG. 3 is a graphical representation of a universal query result set generated by combining the identification of items from the different search index result sets returned in response to a query, in accordance with an embodiment of the present invention.

Returning to FIG. 1, the query controller 113 determines the highest probability matches from the different items from the independent search index result sets for use in adding to the universal query result set. Techniques for determining the highest probability matches are described in more detail below with respect to FIGS. 4-7. Generally described, the probability is determined based on existing content of the universal query result set, the likelihood of a particular search index returning an identification of an item that will satisfy the query, historical queries, and a relevance score of the items identified by the different search indexes. For example, FIG. 3 is a graphical representation of a universal query result set generated by combining the identification of items from the different search index result sets 201-211 returned in response to a query for the query parameter "Howard," in accordance with an embodiment of the present invention. In particular, the universal query result set 300 identifies that the highest probability item that may satisfy the query parameter "Howard" is the book "Howard, the Autobiography" 301 and the second highest probability item being the DVD "Howard and God" 303.

In contrast, a simple merging of the independently returned search index result sets could result in an ordered listing of items having the book "Howard, the Autobiography" as the highest probability, followed by the book "Howard's Evil Empire." As described above, such a simple merging may not result in an accurately ordered list of items because the different search indexes order items based upon different criteria.

Because the query controller 113 utilizes embodiments of the present invention for identifying the items that have the highest probability of satisfying the query parameters, the items listed in the universal query result set may be ordered differently than a simple merging of search index results. Additionally, items from different search index results that are ranked using different ranking techniques may also be merged based on an overall probability. Utilizing an overall probability, items with a lower ranking, as assigned by the returning search index, may be ordered higher in the universal query result set than an item from another search index that has a higher ranking. For example, the query result item "Howard Visits Rome" 305 has a ranking of 95% as assigned by the DVD search index 103, whereas the item "Howard's Evil Empire" 307 has a ranking of 99% as assigned by the books search index 101. Thus, as can be seen from the universal query result set 300 illustrated in FIG. 3, the items listed in the universal query result set are not simply an ordering of the different items based on rankings assigned by the different search indexes.

Once the desired number of items have been identified and added to the universal query result set, the query controller 113 returns the universal query result set to the source of the query. In alternative embodiments, the query controller 113 may generate and deliver the universal result set to a separate location independent of the location that submitted the query. The entity receiving the universal query result set may then interact with the universal result set as if it were a typical result set. As interaction with the universal result set occurs, the query controller 113 tracks and retains those interactions for use in generating future universal query results in response to queries containing similar or the same parameters. The query and the tracked interactions are referred to herein as a "historical query." Because ordering of items in the universal query result is partially dependent upon results of similar queries, a subsequent query for the parameter "Howard" may return a different universal query result set. For example, if interactions with the universal query result set 300 (FIG. 3) often resulted in the purchase of the DVD "Howard and God" 303, a future query for the same parameter may result in the DVD "Howard and God" 303 being ordered as the most probable item satisfying the query.

Figure 4:
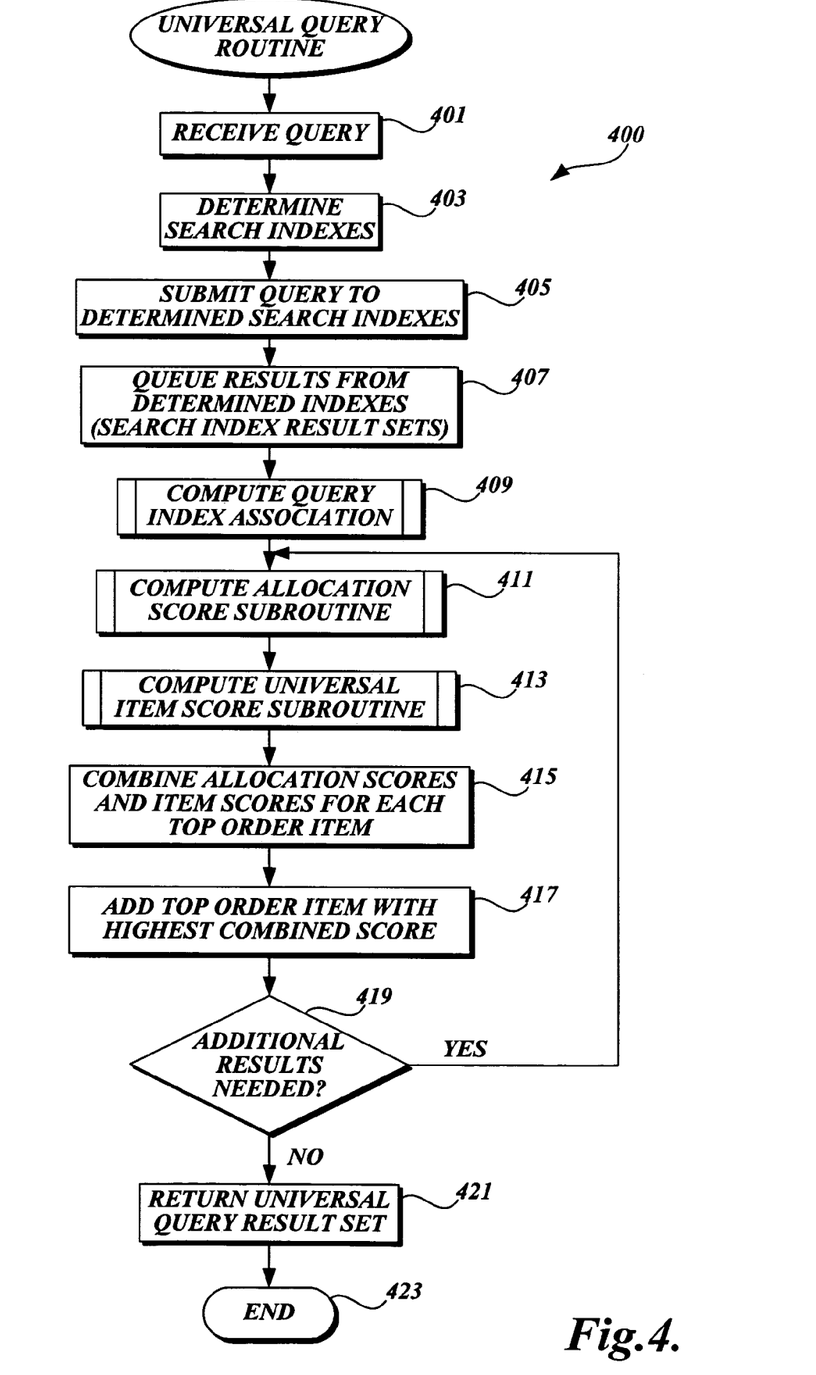
FIG. 4 is a flow diagram of a universal query routine in which results from separate search indexes are to be obtained, combined, and returned for a received query, in accordance with an embodiment of the present invention.

FIG. 4 is a flow diagram of a universal query routine in which results from separate search indexes are to be obtained, combined, and returned for a received query, in accordance with an embodiment of the present invention. At an initial point, at block 401 a query is received and in response to receiving that query, the search indexes to be queried is determined, as illustrated by block 403. In an alternative embodiment, all available search indexes may be selected. Upon determination of the search indexes to be queried, at block 405 the received query is submitted to each of the determined search indexes. After submitting the query to the determined search indexes, search index result sets are received from each of the determined search indexes and queued for use in generating a universal query result, as illustrated by block 407. Additionally, if the search index results sets utilize different ranking criteria, the ranking criteria may be normalized to a common ranking criteria.

At subroutine block 409, a query index association is computed, or determined, for each of the determined search indexes, as described in more detail below with respect to FIG. 5. Additionally, an allocation score is computed for each determined search index, as illustrated by subroutine block 411. Techniques for computing allocation scores for determined search indexes are described in more detail below with respect to FIG. 6. At subroutine block 413, a universal item score is computed for each of the top ordered items listed in each of the search index result sets that have not previously been added to the universal query result set, as described in more detail below with respect to FIG. 7.

Upon computing the allocation scores and the universal item scores at subroutine blocks 411 and 413, at block 415, for each top order item from the queued search index result sets, or for each queued search index result set, the allocation score and universal item score are combined. Any technique may be used for combining the allocation score and the universal item score. For example, the allocation score and the universal item score may be combined using addition, multiplication, averaging, etc.

At block 417, the identification of the top order item with the highest combined score is added in an ordered fashion to the universal query result set. As the universal query routine 400 continues, identifications of items are selected and added in order to generate a complete universal query result set. At decision block 419, a determination is made as to whether additional results are needed for completion of the universal query result set. If it is determined at decision block 419 that additional results are needed, the universal query routine 400 returns to subroutine block 411 and continues. However, if it is determined at decision block 419 that additional results are not needed, at block 421 the universal query result set is returned and the universal query routine 400 completes, as illustrated by block 423.

Figure 5:
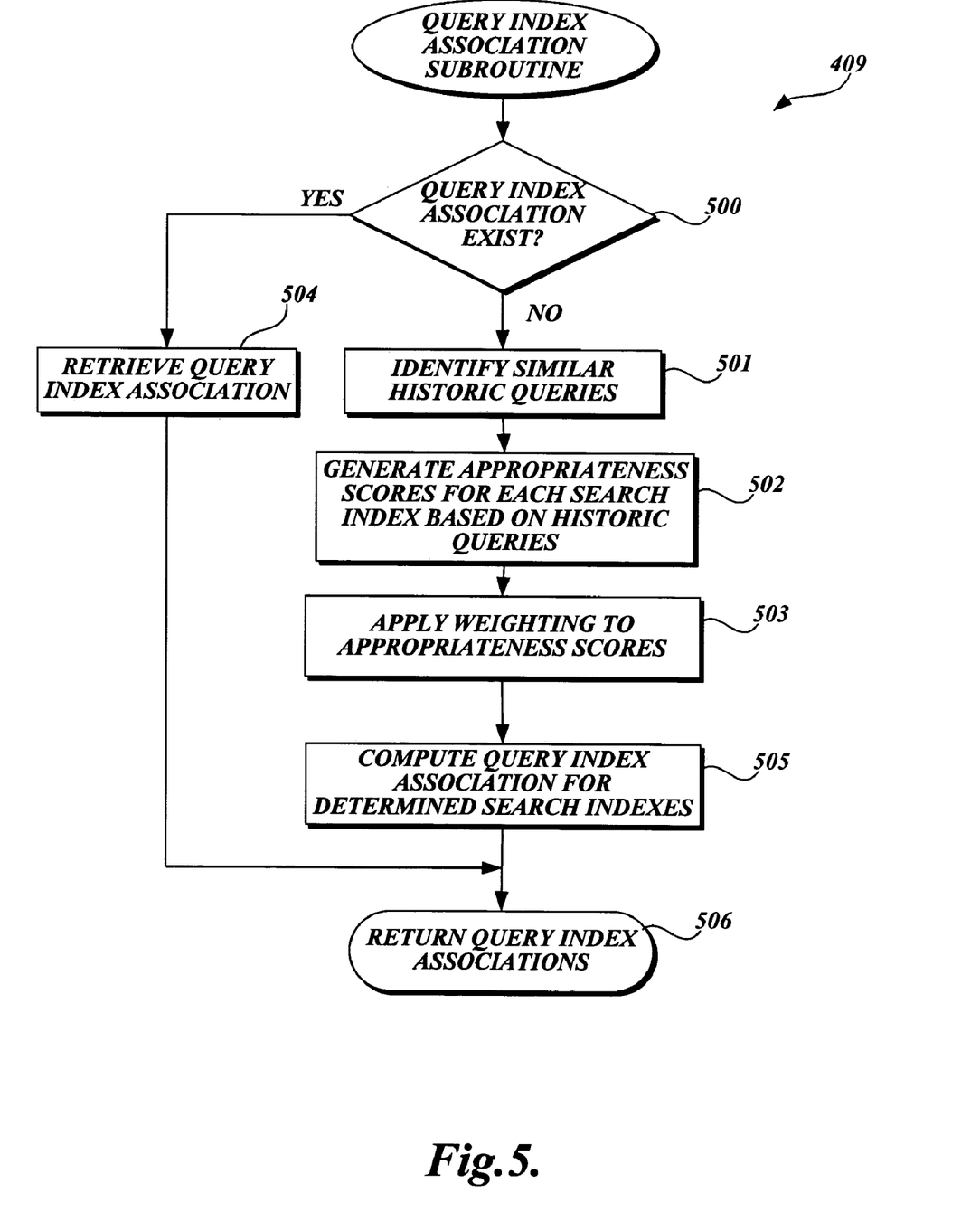
FIG. 5 is a flow diagram of the query index association subroutine for computing query index associations for each determined search index, in accordance with an embodiment of the present invention.

FIG. 5 is a flow diagram of the query index association subroutine 409 for computing query index associations for each determined search index, in accordance with an embodiment of the present invention. At decision block 500 it is determined whether a query index association for the determined search indexes exist for the query. For example, as query index associations are generated for search indexes, based on a given query, they may be stored and reused for subsequent queries having the same or similar parameters. Alternatively, or in addition thereto, at predetermined times (e.g., nightly) query index associations may be computed for all search indexes based on prior queries.

If it is determined at decision block 500 that query index associations exist for the determined search indexes for the query, at block 504 the query index associations are retrieved and returned at block 506. Query index associations for determined search indexes may be determined to exists for the query if the historical queries used to generate the query index associations have the same or similar parameters to that of the existing query, as described with respect to block 501 through 503, and 505.

If it is determined at decision block 500 that query index associations for the determined search indexes do not exist for the query, at block 501, historical queries having the same or similar parameters are identified. Historical queries having similar parameters may be those that have at least one common parameter to that of the query. Upon determination of historical queries, at block 502 "appropriateness scores" for the determined search indexes are generated based on the actions tracked and stored as part of the identified historical queries. An "appropriateness score," as used herein, is a score, such as a numerical value, that is computed and assigned to each determined search index based on actions recorded as part of the determined historical queries. For example, each historical query may contain one or more user actions. Actions include, but are not limited to, selecting an identified item for viewing, purchasing an identified item, selecting the item for potential purchase, selecting a category of an item, etc. The appropriateness score may be different based on the action. For example, the purchase of an item may be given a higher score than the viewing of an item. For each action, the search index, or indexes, from which the item was provided is identified and an appropriateness score for that action is assigned to the identified search index(es).

In addition to generating appropriateness scores based on the action, those scores may be weighted or adjusted, as illustrated by block 503. Any type of weighting may be applied to the appropriateness scores. For example, the appropriateness scores may be weighted or adjusted based on time, similarity of the historical query parameters to those of the current query parameters, etc. In one embodiment, appropriateness scores determined for older historical queries may be given a lower weighting than those of more recent historical queries. Similarly, appropriateness scores determined for historical queries that are similar to those of the current query may be given a lower weighting than those that exactly match the current query.

Based on the appropriateness scores assigned to the determined search indexes at block 502, query-index associations are computed for each determined search index, as illustrated by block 505. In one embodiment, the query index associations are computed for each search index by summing the assigned appropriateness scores. In essence, the query index association score for each search index is a probability estimate of a given query, and that all else being equal, the chance that the result that is desired originates from the determined search index. After the query index associations for each determined search index have been computed, at block 506, the query index association subroutine 409 returns the determined query index associations to the universal query routine 400 (FIG. 4), as illustrated by block 509 and completes.

In embodiments in which query index associations are computed at predetermined times (e.g., nightly), instead of re-computing all the appropriateness scores for historical queries each time, embodiments of the present invention may utilize the previously computed query index associations to generate updated query index associations that take into consideration recent queries. For example, for each query that had not previously been considered in generating query index associations, appropriateness scores are determined and assigned to the appropriate search index(es) and current query index associations are computed for each search index for the query. The pre-existing query index associations for those search indexes for that same or similar query may then be weighted based on time to reduce the value of older query index associations and combined with the current query index association for the query and search index. Utilization of pre-computed query index associations may improve efficiency of real-time query processing.

Figure 6:
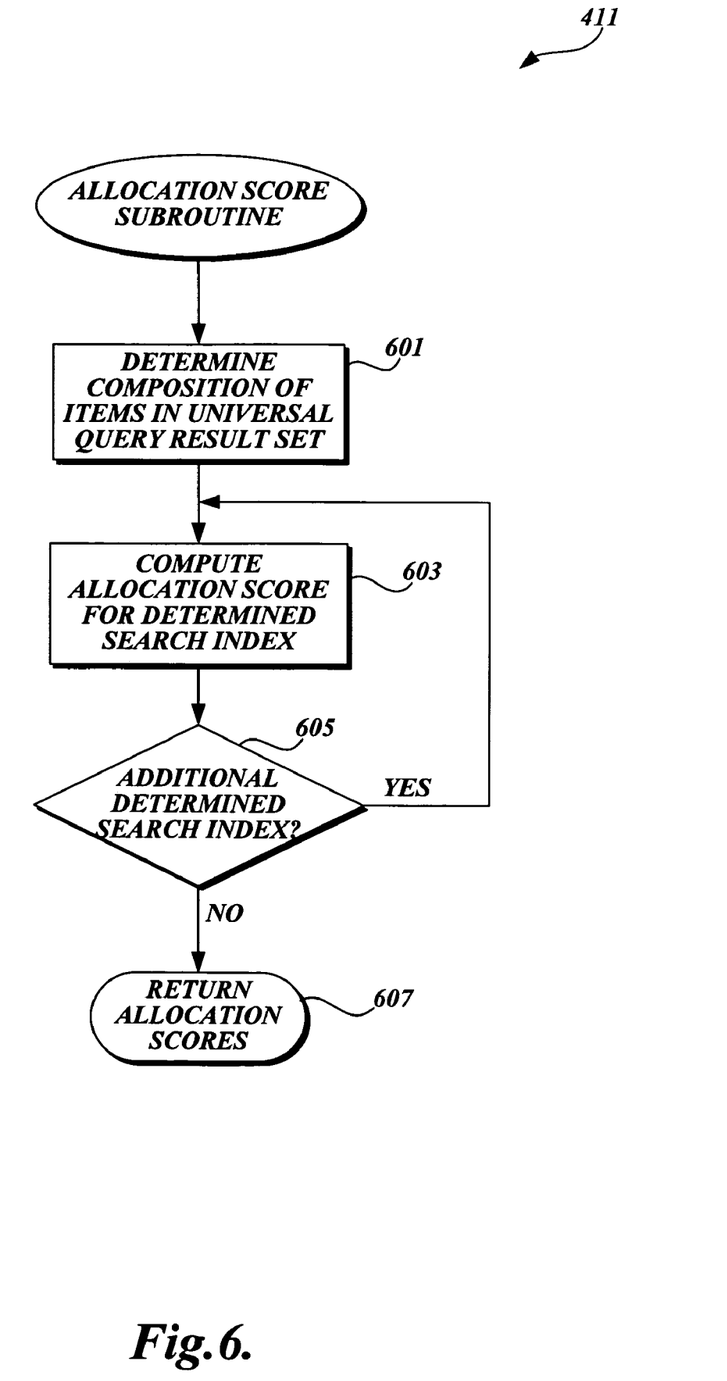
FIG. 6 is a flow diagram of the allocation score subroutine for computing an allocation score for each determined search index for which a search index result set is being obtained, in accordance with an embodiment of the present invention.

FIG. 6 is a flow diagram of the allocation score subroutine 411 for computing an allocation score for each determined search index for which a search index result set is being obtained, in accordance with an embodiment of the present invention. At block 601, the composition of items listed in the universal query result set is determined. For example, referring back to FIG. 3, it may be determined that the composition of the universal query result set being constructed lists one item from the book search index and two items from the DVD search index. Based on the determined composition of items listed in the universal query result set, as determined at block 601, and based upon the computed query index association for a determined search index, an allocation score for the determined search index may be determined, as illustrated by block 603. In particular, if the composition of listed items in the universal query result set determined at block 601 has a larger percentage of items from one search index, such as the DVD search index, the allocation score for the DVD search index will be lower because there is a lower probability that the next most likely item will also be identified from that same search index. Likewise, the allocation score computed for a determined search index other than the DVD search index, such as the book search index, will be a higher score because there is a higher probability that the next most likely matching result will come from that determined search index, instead of the DVD search index. Upon computation of the allocation score for a determined search index at block 603, at decision block 605, a determination is made as to whether additional determined search indexes exist for which an allocation score is to be computed. If it is determined at decision block 605 that additional determined search indexes exist, the allocation score subroutine 600 returns to block 603 and continues. However, if it is determined at decision block 605 that no additional determined search indexes exist for which an allocation score still needs to be computed, the allocation score subroutine 600 returns the computed allocation scores to the universal query search routine 400 (FIG. 4) as illustrated by block 607 and completes.

Figure 7:
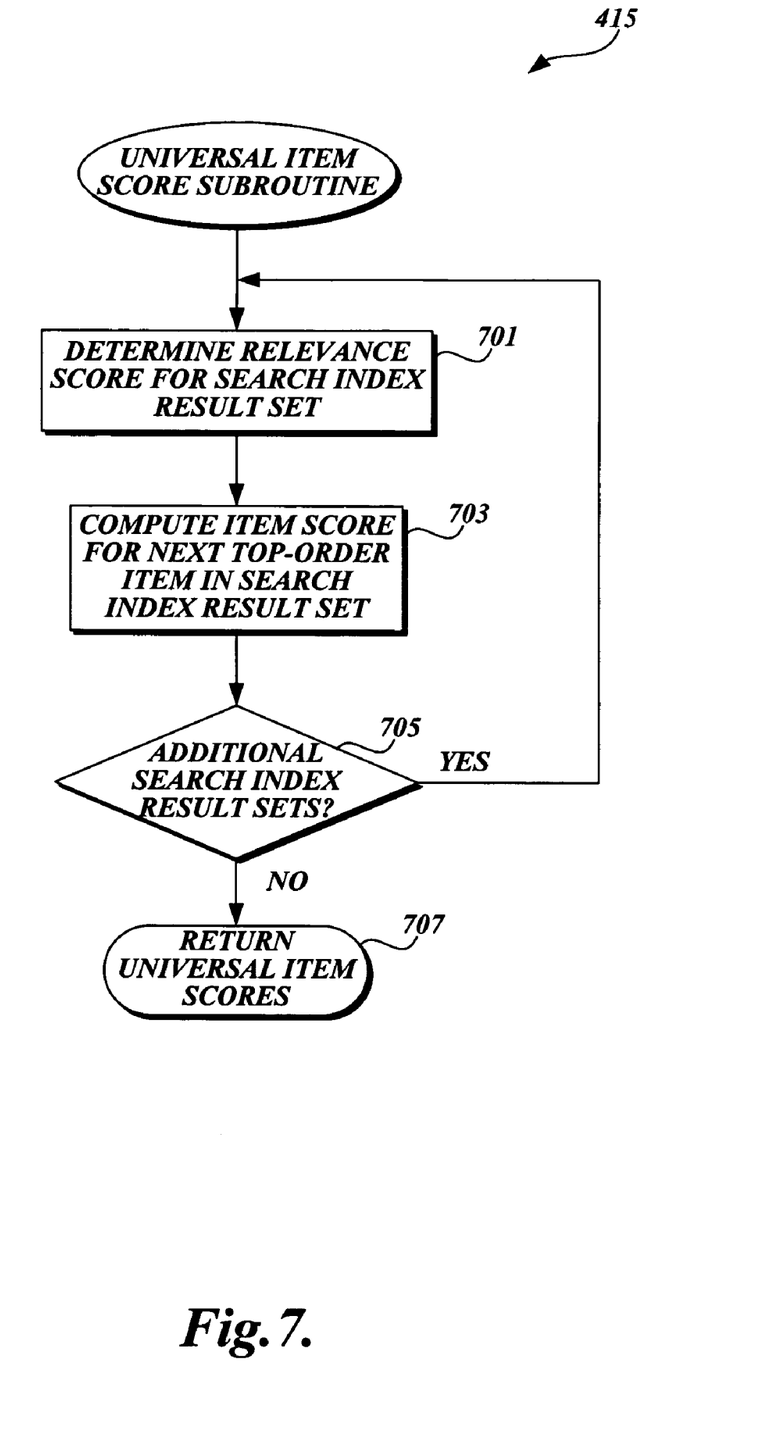
FIG. 7 is a flow diagram of a universal item score subroutine for computing a universal item score for the next top order item listed in each of the search index result sets that have been queued, in accordance with an embodiment of the present invention.

FIG. 7 is a flow diagram of a universal item score subroutine for computing a universal item score for the top order item listed in each of the search index result sets that have been queued, in accordance with an embodiment of the present invention. At block 701, a relevance score for a search index result set that has been queued by the universal query routine 400 is determined. A relevance score for a search index result set may be determined based on knowledge about the internal ranking functions of the determined search index from which the search index result set was obtained. As discussed above, while scores for items contained in different search index result sets received from different search indexes are not directly comparable, they can be used to compare items within a same index and a goodness score may be computed to represent, given the search index, how good a match the particular given result is.

Upon determination of a relevance score for a search index result set, at block 703, a universal item score for the top order item listed in the search index result set that has not already been included in the universal query result set is computed. A universal item score may be computed based on the relevance score of the search index result set from which it was obtained, the existing contents of the universal query result set, based on the relevance score assigned to the item in the search index result set by the determined search index that generated that set, or any combination thereof. At decision block 705, a determination is made as to whether additional search index result sets exist for which a universal item score for the next result in the search index result set is to be computed. If it is determined at decision block 705 that additional index result sets exist for which a universal item score for the top order item listed in the search index result set is to be computed, the universal item score subroutine 415 returns to block 701 and continues. However, if it is determined that additional search index result sets do not exist, at block 707, the computed universal item scores are returned to the universal query routine 400 as illustrated by block 707 and the routine 415 completes.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method for generating a universal query result set, comprising:
    under control of one or more computer systems configured with executable instructions,
        submitting a received query to a plurality of search indexes, each search index associated with a relevance ranking function for ranking items according to an individual ranking scale, at least two of the individual ranking scales being different;
        receiving from the plurality of search indexes a plurality of search index result sets, each search index result set including one or more items related to the received query and ranked according to one of the individual ranking scales;
        determining a query index association for each of the plurality of search indexes; and
        including in the universal query result set a list of items obtained from different ones of the plurality of search index result sets, the list being ordered based at least in part on a probability of the items satisfying the query, the probability of the items satisfying the query determined at least in part by:
            computing an allocation score for each of the plurality of search indexes, the allocation score for each search index being computed based at least in part upon a relative number of search results in the corresponding search index result set;
            for each of the plurality of received search index result sets, computing a universal item score for at least one item identified in the search index result set, the universal item score for each identified item being computed at least in part by normalizing the individual ranking scale for each search index result set to a common ranking scale; and
            determining a probability of each item satisfying the query based at least on a combination of the allocation score for the search index associated with the item and the universal item score for the item.

2. The computer-implemented method of claim 1, further comprising:
    determining a query index association for each of the plurality of search indexes.

3. The computer-implemented method of claim 2, wherein determining a query index association includes selecting a predefined query index association from a plurality of query index associations based on a query.

4. The computer-implemented method of claim 2, wherein determining a query index association includes computing a query index association based on a plurality of historical queries that are similar to the query.

5. The computer-implemented method of claim 2, wherein determining a query index association includes:
    identifying similar historical queries;
    determining for each of the plurality of search indexes, a probability of a listed item identified by the search index satisfying the query, wherein the probability is determined based on a result of identified similar historical queries; and
    generating for each of the plurality of search indexes, a query index association based on the determined probabilities.

6. The computer-implemented method of claim 2, wherein computing an allocation score includes:
    computing an allocation score for each of the plurality of search indexes based further on the query index association determined for the search index.

7. The computer-implemented method of claim 1, wherein computing a universal item score includes:
    determining a relevance score for the search index result set;
    computing a universal item score for items identified in the search index result set, wherein the universal item score is computed based upon a composition of items identified in the universal query result set, the relevance score for the search index result set, and based upon a ranking of the identified item provided by the search index.

8. The computer-implemented method of claim 1, further comprising:
    tracking a result of the returned universal query result set; and
    storing the tracked result and the query as a historical query.

9. The computer-implemented method of claim 8, wherein the result is a selection of an item identified in the returned universal query result set.

10. The computer-implemented method of claim 8, wherein the combination of the allocation score and the universal item score identifies an item having a highest probability of satisfying the query.

11. The computer-implemented method of claim 1, wherein the plurality of search indexes utilize different parameters for determining an item to identify in the search index result set; and wherein adding an identification of an item from the plurality of identified items to the universal query result set based on a combination of the allocation score and the universal item score identifies an item that has a highest probability of satisfying the query.

12. The computer-implemented method of claim 1, wherein the allocation score and the universal item score are combined by at least multiplying the allocation score and the universal item score.

13. A computer system having a computer-readable storage medium including a computer-executable program therein for performing a method for generating a universal query result set in response to a query, comprising:
submitting the query to a plurality of search indexes, each search index associated with a relevance ranking function for ranking items according to an individual ranking scale, at least two of the individual ranking scales being different;
queuing a plurality of search index result sets, each of the plurality of search index result sets being ordered lists identifying items related to the query and ranked according to one of the individual ranking scales;
determining a query index association for each of the plurality of search indexes; and
including in the universal query result set a list of identifications of items obtained from different ones of the plurality of search index result sets, the list being ordered based at least in part on a probability of the items satisfying the query, the probability of the items satisfying the query determined at least in part by:
computing an allocation score for each of the plurality of search indexes, the allocation score for each search index being computed based at least in part upon a relative number of search results in the corresponding search index result set;
for each of the plurality of search index result sets, computing a universal item score for at least one item identified in the respective search index result set, the universal item score for each identified item being computed at least in part by normalizing the individual ranking scale for each of the plurality of search index result sets to a common ranking scale; and
determining a probability of at least a first item satisfying the query based at least upon a combination of the allocation score for the search index associated with the first item and the universal item score for the first item.

14. The computer system of claim 13, wherein determining the first item further includes:
creating a first combined score by combining the allocation score related to the first search index result set with the universal item score for a top order item listed in the first search index result set;
creating a second combined score by combining the allocation score related to the second search index result set with the universal item score for a top order item listed in the second search index result set; and
comparing the first combined score and the second combined score and selecting the top order item having a highest combined score.

15. The computer system of claim 14, wherein computing an allocation score related to the first search index result set includes:
determining a percentage of items listed in the universal query result set that are related to the first search index result set; and
adjusting the allocation score related to the first search index result set based at least in part on the determined percentage of items listed in the universal query result set that are related to the first search index result set.

16. The computer system of claim 15, wherein adjusting the allocation score includes:
reducing the allocation score if there is a high percentage of items listed in the universal query result set that are related to the first search index result set.

17. The computer system of claim 15, wherein adjusting the allocation score includes:
increasing the allocation score if there is a low percentage of items listed in the universal query result set that are related to the first search index result set.

18. The computing system of claim 13, further comprising:
determining a probability of at least a second item satisfying the query based at least in part on a combination of the allocation score for the search index associated with the second item and the universal item score for the second item; and
adding an identification of the second item to the universal query result set.

19. The computer system of claim 18, further comprising:
continuing to add identification of items to the universal query result set based on determined probabilities until a predetermined number of items have been listed.

20. The computer system of claim 19, further comprising:
transmitting the universal query result set to a destination after a predetermined number of items have been listed in the universal query result set.

21. The computer system of claim 19, further comprising:
tracking a result of the transmitted universal query result set; and
storing the tracked result and the query as a historical query.

22. The computer system of claim 19, wherein the result is an action taken with respect to items identified in the transmitted universal query result set.

23. The computer system of claim 13, further comprising determining the plurality of search indexes for use in obtaining results to the query.

24. The computer system of claim 23, wherein determining the plurality of search indexes includes, identifying search indexes that have provided identifications of items listed in response to historical queries that are similar to the query.

25. The computer system of claim 23, wherein determining the plurality of search indexes includes, identifying search indexes that have provided identifications of items selected from responses to historical queries that are similar to the query.

26. A computer-readable storage medium having instructions stored thereon that direct a computing system to, at least:
submit a query to a plurality of search indexes, each search index associated with a relevance ranking function for ranking items according to an individual ranking scale, at least two of the individual ranking scales being different;
queue a plurality of search index result sets received from the plurality of search indexes, each of the plurality of search index result sets being ordered lists identifying items related to the query and ranked according to one of the individual ranking scales;
determine a query index association for each of the plurality of search indexes; and
create a universal query result set that includes a list of items obtained from the plurality of search index result sets, the list being ordered based on at least a probability of those items satisfying the query, the list of items containing items obtained from different search index result sets, wherein the probability of the items of the list satisfying the query is determined at least in part by:

computing an allocation score for each of the plurality of search indexes, the allocation score for each search index being computed based at least in part upon a relative number of search results in the corresponding search index result set;

for each of the plurality of search index result sets, computing a universal item score for at least one item identified in the respective search index result set, the universal item score for each item being computed at least in part by normalizing the individual ranking scale for each of the plurality of search index result sets to a common ranking scale; and determining a probability of each item satisfying the query based at least upon a combination of the allocation score for the search index associated with the item and the universal item score for the item.

27. The computer-readable medium of claim 26, wherein the instructions that direct the computing system to determine a query index association include instructions that direct the computing system to:

identify similar historical queries;

determine an appropriateness value for the identified similar historical queries; and determine a query index association for each of the plurality of search indexes based on a relationship of the search index to the historical query and the appropriateness value of the historical query.

28. The computer-readable medium of claim 26, wherein the instructions that direct the computing system to create a universal query result set further include instructions that direct the computing system to:

compute the allocation score for each of the plurality of search indexes.

29. The computer-readable medium of claim 26, wherein the allocation score is further computed based on the computed query index association.

30. The computer-readable medium of claim 26, wherein the instructions that direct the computing system to create a universal query result set further include instructions that direct the computing system to:

compute the universal item score for an item listed in each of the plurality of search index result sets.

31. The computer-readable medium of claim 30, wherein the universal item score is further computed based upon a relevance score of the search index result set.

32. The computer-readable medium of claim 31, wherein the relevance score is determined based upon internal ranking functions used by the respective search index in generating the search index result set.

33. The computer-readable medium of claim 31, wherein the relevance score is determined based upon a ranking of the item as assigned by the respective search index.

34. The computer-readable medium of claim 26, wherein the probability is a predicted probability.

* * * * *